US011960048B2

(12) United States Patent
Su et al.

(10) Patent No.: US 11,960,048 B2
(45) Date of Patent: Apr. 16, 2024

(54) THREE-DIMENSIONAL ELECTRICAL RESISTIVITY TOMOGRAPHY METHOD AND SYSTEM

(71) Applicant: SHANDONG UNIVERSITY, Shandong (CN)

(72) Inventors: Maoxin Su, Jinan (CN); Shucai Li, Jinan (CN); Yimin Liu, Jinan (CN); Yiguo Xue, Jinan (CN); Li Guan, Jinan (CN); Peng Wang, Jinan (CN)

(73) Assignee: SHANDONG UNIVERSITY, Shandong (CN)

( * ) Notice: Subject to any disclaimer, the term of this patent is extended or adjusted under 35 U.S.C. 154(b) by 282 days.

(21) Appl. No.: 17/431,051

(22) PCT Filed: Nov. 17, 2020

(86) PCT No.: PCT/CN2020/129416
§ 371 (c)(1),
(2) Date: Aug. 13, 2021

(87) PCT Pub. No.: WO2021/243967
PCT Pub. Date: Dec. 9, 2021

(65) Prior Publication Data
US 2022/0308251 A1    Sep. 29, 2022

(30) Foreign Application Priority Data
Jun. 3, 2020    (CN) .......................... 202010495471.X (51) Int. Cl.
*G01V 3/38*    (2006.01)
*G01N 27/04*    (2006.01)
(52) U.S. Cl.
CPC .............. *G01V 3/38* (2013.01); *G01N 27/041* (2013.01); *G01V 2210/6652* (2013.01)

(58) Field of Classification Search
CPC .... G01V 3/38; G01V 3/00; G01V 2210/6652; G01V 2210/665; G01V 2210/66;
(Continued)

(56) References Cited

U.S. PATENT DOCUMENTS

| | | | |
|---|---|---|---|
| 6,295,512 B1* | 9/2001 | Bryant | ..................... G01V 3/02 324/357 |
| 2016/0313468 A1* | 10/2016 | Du | .......................... G01V 1/28 |
| 2019/0331813 A1 | 10/2019 | Zhang et al. | |

FOREIGN PATENT DOCUMENTS

| | | |
|---|---|---|
| CN | 110361792 A | 10/2019 |
| CN | 110823962 A | 2/2020 |

(Continued)

OTHER PUBLICATIONS

Papadopoulos, "Two-dimensional and Three-dimensional Resistivity Imaging in Archaeological Site Investigation" 2006, Archaeol. Prospect. 13, 163-181 (Year: 2006).*

(Continued)

*Primary Examiner* — Mohamed Charioui
(74) *Attorney, Agent, or Firm* — JCIPRNET (57) ABSTRACT

A three-dimensional electrical resistivity tomography method and system belonging to the field of geological geophysical prospecting, the method including the steps of prospecting a region containing a geological anomaly with at least two prospecting modes respectively to acquire two-dimensional resistivity data of a corresponding detection plane; unifying coordinate systems of resistivity data points acquired in all prospecting modes, and extracting data points with the same coordinates; carrying out data fusion on extracted resistivity data at the same position by utilizing a principal component analysis method; and carrying out three-dimensional coordinate conversion on resistivity data acquired after fusion to form a three-dimensional model.

12 Claims, 3 Drawing Sheets

(58) Field of Classification Search
CPC .. G01V 2210/60; G01V 2210/00; G01V 3/30; G01V 3/28; G01V 3/26; G01V 3/18; G01N 27/041; G01N 27/04; G01N 27/02; G01N 27/00
See application file for complete search history.

(56) References Cited

FOREIGN PATENT DOCUMENTS

| | | |
|---|---|---|
| CN | 111123404 A | 5/2020 |
| CN | 111722292 A | 9/2020 |
| WO | 2016/018492 A1 | 2/2016 |

OTHER PUBLICATIONS

Yu et al.; "Mathematical Geology Method and Application;" Chapter 8 Principal Component and Factor Analysis; 2019; pp. 110-111.
Li et al.; "An analytical model for surrounding rock classification during underground water-sealed caverns construction: a case study from eastern China;" Environmental Earth Sciences; 2019; pp. 1-11; vol. 78, No. 602.
Looms et al.; "Identifying Unsaturated Hydraulic Parameters Using an Integrated Data Fusion Approach on Cross-Borehole Geophysical Data;" Vadose Zone Journal; 2008; pp. 238-248; vol. 7, No. 1.
Ziqing LU; "Joint Inversion Method and Application of Apparent Resistivity Based on Geophysical Prospecting Data Fusion;" Chinese Excellent Masterchar Degree Thesis Full-Text Database Basic Science Series, No. 3; 2015; pp. A011-A347.
Feb. 20, 2021 Search Report issued in Chinese Patent Application No. 202010495471.X.
Mar. 2, 2021 Office Action issued in Chinese Patent Application No. 202010495471.X.
Feb. 25, 2021 Search Report issued in International Patent Application No. PCT/CN2020/129416.
Feb. 25, 2021 Written Opinion of the International Searching Authority issued in International Patent Application No. PCT/CN2020/129416.

* cited by examiner

THREE-DIMENSIONAL ELECTRICAL RESISTIVITY TOMOGRAPHY METHOD AND SYSTEM

BACKGROUND

Technical Field

The present invention belongs to the field of geological geophysical prospecting, and particularly relates to a three-dimensional electrical resistivity tomography (ERT) method and system.

Related Art

The description in this section merely provides background information related to the present invention and does not necessarily constitute the prior art.

In the field of geophysical prospecting at present, various types of geophysical prospecting methods such as geological radar, a cross-hole ERT method, a borehole-surface ERT method, a surface ERT method, a transient electromagnetic method, and the like are commonly used detection means on an engineering site. Generally, the above geophysical prospecting methods only have a good detection effect in certain ranges, and have respective defects. For example, the geological radar carries stratum dielectric constant information in a reflection signal of a high-frequency electromagnetic wave and has strong resolution capability, but is limited in detection depth. The surface ERT method can obtain a large amount of data in one-time detection and has a good response to high-resistivity abnormity, but is greatly affected by terrain fluctuation.

The inventor found that when different geophysical prospecting results are imaged independently, due to the limitation of respective precision and detection depth, the distinction of the anomaly boundaries is not obvious or there is pseudo anomaly interference, and thud the detection precision is reduced.

SUMMARY

In order to solve the above problems, a first aspect of the present invention provides a three-dimensional electrical resistivity tomography method which can compare resistivity data acquired with at least two geophysical prospecting methods to select out resistivity data points with the same prospecting region coordinates, carry out data fusion on the data points acquired with the at least two prospecting geophysical prospecting methods based on a principal component analysis method, and finally form a three-dimensional model through three-dimensional coordinate conversion, such that the detection precision is improved, and meanwhile the detection result have good intuitiveness and visibility.

In order to realize the foregoing objective, the present invention adopts the following technical solutions:

A three-dimensional electrical resistivity tomography method includes:
  prospecting a region containing a geological anomaly with at least two prospecting modes respectively to acquire two-dimensional resistivity data of a corresponding detection plane;
  unifying coordinate systems of resistivity data points acquired in all prospecting modes, and extracting data points with the same coordinates;
  carrying out data fusion on extracted resistivity data at the same position by utilizing a principal component analysis method; and
  carrying out three-dimensional coordinate conversion on resistivity data acquired after fusion to form a three-dimensional model.

A second aspect of the present invention provides a three-dimensional electrical resistivity tomography system.

The three-dimensional electrical resistivity tomography system includes:
  a two-dimensional resistivity data acquisition module, configured to prospect a region containing a geological anomaly with at least two prospecting modes respectively to acquire two-dimensional resistivity data of a corresponding detection plane;
  a same coordinate data point extraction module, configured to unify coordinate systems of resistivity data points acquired in all prospecting modes and extract data points with the same coordinates;
  a data fusion module, configured to carry out data fusion on extracted resistivity data at the same position by utilizing a principal component analysis method; and
  a three-dimensional conversion module, configured to carry out three-dimensional coordinate conversion on resistivity data acquired after fusion to form a three-dimensional model.

The third aspect of the present invention provide a computer-readable storage medium.

The computer readable storage medium stores a computer program, and the steps in the above three-dimensional electrical resistivity tomography method are implemented when the program is executed by a processor.

A fourth aspect of the present invention provides a computer device.

The computer device includes a memory, a processor and a computer program stored in the memory and capable of running on the processor. The steps in the above three-dimensional electrical resistivity tomography method are implemented when the program is executed by the processor.

The present invention has the following beneficial effects:
  (1) The present invention compares resistivity data acquired with at least two geophysical prospecting methods to select out resistivity data points with the same prospecting region coordinates, carry out data fusion on the data points acquired with the at least two geophysical prospecting methods based on a principal component analysis method, and finally form a three-dimensional model through three-dimensional coordinate conversion. The detection precision is improved, and meanwhile the detection result has good intuitiveness and visibility.
  (2) The three-dimensional coordinate conversion imaging method of the present invention has good visibility, and can integrate section data of a plurality of two-dimensional planes into a three-dimensional model, which quite intuitively reflects the real situation of an anomaly in the detection region, and is also convenient for later interpretation, analysis, and guidance.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

The present invention is further described below with reference to the accompanying drawings and embodiments.

It should be pointed out that the following detailed descriptions are all illustrative and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

Embodiment 1

The idea of the three-dimensional electrical resistivity tomography method of this embodiment is:

A region containing a geological anomaly is prospected with at least two prospecting modes respectively to acquire two-dimensional resistivity data of a corresponding detection plane. Coordinate systems of resistivity data points acquired in all prospecting modes are unified, and data points with the same coordinates are extracted. Data fusion is carried out on extracted resistivity data at the same position by utilizing a principal component analysis method. Three-dimensional coordinate conversion is carried out on resistivity data acquired after fusion to form a three-dimensional model.

For example, the positions of geological anomalies such as water-filled karst caves, faults with water permeability, and the like are roughly determined by analyzing geological data, and then geophysical prospecting, namely cross-hole resistivity CT detection and surface ERT detection, is carried out on the geological anomaly region. After detection data of the two methods are acquired, a resistivity two-dimensional section distribution diagram of the cross-hole resistivity detection and a resistivity two-dimensional section distribution diagram of the surface ERT detection are acquired through a geophysical inversion method.

After resistivity data of a plurality of two-dimensional sections of the two methods is acquired through detection and inversion, the acquired coordinate system where the surface ERT resistivity data points are located and the acquired coordinate system where the cross-hole resistivity data points are located are unified through a coordinate conversion mode at first, such that the coordinates of the data points acquired through prospecting at the same position in a region with the two methods are the same. Then, data points with the same coordinates in the prospecting region are extracted from the data acquired by the surface ERT method and the data acquired by the cross-hole ERT method, and subjected to data fusion based on a principal component analysis method.

After the data acquired by the surface ERT method and the data acquired by the cross-hole ERT method are fused, resistivity data of the plurality of two-dimensional sections is acquired. Then, the acquired data points in a two-dimensional coordinate system are converted to be in a three-dimensional coordinate system. A plurality of data points in the three-dimensional coordinate system are integrated and imaged through a Kriging interpolation method to form a three-dimensional model.

According to the data fusion method of this embodiment, aiming at a single anomaly body, through data fusion, the problem that the imaging effect of the cross-hole resistivity CT method near a hole is poor can be relieved, a low-resistivity anomaly near an electrode can be accurately positioned, and the distribution range and number of high-resistance pseudo anomalies of cross-hole accessories are reduced. For anomalies distributed side by side, through data fusion, the problems that the cross-hole resistivity CT is poor in imaging in a horizontal direction and the surface ERT method is poor in imaging in a vertical direction can be relieved, so that two geoelectric anomalies are separated, and images are more visualized. The two complement each other, such that the image interpretation capability of an ERT method is improved.

Figure 1:
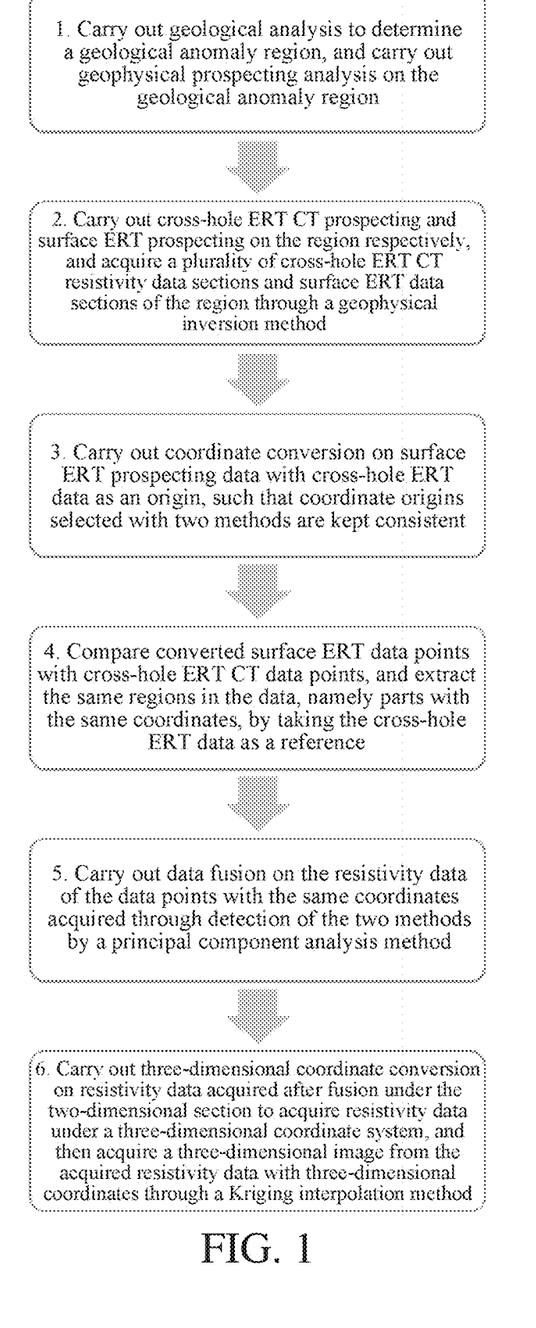
FIG. 1 is a flowchart of a three-dimensional electrical resistivity tomography method of an embodiment of the present invention.

The surface ERT method and the cross-hole ERT method are taken as examples:

As shown in FIG. 1, a process of the three-dimensional electrical resistivity tomography method comprises:
1. Geological analysis is carried out to determine a geological anomaly region. Through engineering geological survey and drilling columnar information, distribution conditions of geological and hydrological phenomena such as geological structure, topography fluctuation, overburden rock, karst cave development, fault with water permeability, and the like in the region are analyzed. Geological data and the like of the region can also be consulted to determine the general position of the geological anomaly body, thus determining a geophysical prospecting way with reference to the factors such as mineral composition, aquosity, and the like of site rock.

2. Surface ERT prospecting and cross-hole resistivity CT prospecting are carried out on a region containing a geological anomaly respectively, and a two-dimensional section of resistivity is acquired through a geophysical inversion method. When cross-hole resistivity prospecting is carried out, a specified position is drilled, then a transmitting electrode and a receiving electrode are respectively arranged in a transmitting hole and a receiving hole according to a certain electrode distance, and then the electrodes are electrified to acquire cross-hole resistivity detection data. When the surface ERT prospecting is carried out, all electrodes (dozens to hundreds) are arranged on a ground survey line, then a program-controlled electrode change-over switch and a microcomputer engineering electrical surveying instrument are used, and meanwhile data of different electrode arrangement modes can also be acquired rapidly and automatically, so that detection data of the surface ERT prospecting is acquired. After the detection data of the cross-hole ERT method and the detection data of the surface ERT method are acquired, geophysical inversion is carried out on the acquired data. The data acquired on site is taken as a forward basis, model parameters are continuously adjusted, and the model response is made to respond to the observation data. That is, the data is interpreted through inversion, so that the two-dimensional resistivity section of a detection plane is acquired.

3. By taking resistivity data points acquired in one prospecting mode as a reference, coordinate conversion is carried out on resistivity data points acquired in the other prospecting mode. For example, by taking the resistivity data points acquired by the cross-hole detection as a reference, coordinate conversion is carried out on the resistivity data points acquired by the high-density method. Because in site detection, positions of initial points of the survey lines detected by the cross-hole ERT method and the surface ERT method may be different, positions of coordinate origins of coordinate systems where the resistivity data points acquired with the two methods are located are different. Therefore, initial coordinates of the two methods are different. The present invention takes the data detected by the cross-hole ERT method as a reference, and the position of the coordinate origin of the resistivity data point coordinate system of the surface ERT method is adjusted, thus being consistent with the coordinate system of the cross-hole ERT method.

4. Resistivity data acquired with the two detection methods under the same coordinate system after coordinate conversion is compared, and data points with the same coordinates are extracted. The part with the same coordinates of the data points acquired by detection of the two methods, namely resistivity data at the same position of a prospecting site is extracted and output.

5. Data fusion is carried out on the extracted resistivity data at the same position by utilizing a principal component analysis method.

Firstly, data centralization is carried out. That is, resistivity sample data acquired with the cross-hole ERT method and the surface ERT method is standardized, and thus errors caused by dimension difference, self-variation or large numerical difference are eliminated.

Then, a covariance matrix between centralized variables is solved, and whether deviation change trends of two variables are consistent or not is measured.

Then, characteristic values and characteristic vectors of covariance are solved, the characteristic values are arranged in an ascending order, the largest characteristic value is selected, and the characteristic vector corresponding to the largest characteristic value is solved.

Finally, a sample point of the centralized data is projected to a characteristic vector base with the maximum characteristic value to acquire a fused resistivity data result which can be considered as comprehensive properties of the cross-hole detection data and the high-density detection data.

6. Three-dimensional coordinate conversion is carried out on two-dimensional section resistivity data acquired after fusion, and a third-dimensional model is formed through a Kriging interpolation method. The above steps include the resistivity data each acquired after fusion under the two-dimensional section, and two-dimensional coordinates of the resistivity data points need to be converted into three-dimensional coordinates.

As shown in FIG. 3(a)-FIG. 3(d), conventional ERT is mainly based on a two-dimensional section, it is necessary to combine a specific position of a survey line in space to realize a good resolution of a range and morphology of an anomaly during imaging interpretation. In order to group data of different ERT methods to the same coordinate system, and to better carry out three-dimensional result interpretation, coordinate conversion modes under four conventional survey line modes within a tunnel range are proposed.

Three-dimensional coordinates of any data point in a tunnel can be acquired through mathematical formula operation, and a method foundation is laid for later three-dimensional mapping. Three-dimensional coordinate conversion is carried out through the following formula:

$$\begin{bmatrix} X \\ Y \\ Z \end{bmatrix} = R_1 \begin{bmatrix} X_1 \\ Y_1 \\ Z_1 \end{bmatrix} + R_2 \begin{bmatrix} X' \\ Y' \\ 0 \end{bmatrix}.$$

where $R_1$ is a position matrix, $R_2$ is a data point matrix, X, Y and Z are final three-dimensional coordinates with O as an origin, $X_1$ is a horizontal distance from a starting point of a survey line to the origin of the coordinates, $Y_1$ is a longitudinal burial depth from the starting point of the survey line to the origin of the coordinates, $Z_1$ is a vertical height from the starting point of the survey line to the origin of the coordinates, X' is a horizontal length of an original data point, and Y' is a detection depth of the original data point.

Specific calculation parameters are as shown in Table 1:

Specific calculation parameters in Table 1

| Survey line type (take diagram identifier as an example) | a-type1 | a-type2 | b-type1 | b-type2 | c-type1 | c-type2 | d-type1 | d-type2 |
|---|---|---|---|---|---|---|---|---|
| direction | Downward | Upward | Downward | Upward | Right half part | Left half part | Lean to the right | Lean to the left |
| R2 | $\begin{bmatrix} 0 & 0 & 0 \\ 1 & 0 & 0 \\ 0 & 1 & 0 \end{bmatrix}$ | $\begin{bmatrix} 0 & 0 & 0 \\ 1 & 0 & 0 \\ 0 & -1 & 0 \end{bmatrix}$ | $\begin{bmatrix} 1 & 0 & 0 \\ 0 & 0 & 0 \\ 0 & 1 & 0 \end{bmatrix}$ | $\begin{bmatrix} 1 & 0 & 0 \\ 0 & 0 & 0 \\ 0 & -1 & 0 \end{bmatrix}$ | $\begin{bmatrix} 0 & -\cos\alpha & 0 \\ 1 & 0 & 0 \\ 0 & -\sin\alpha & 0 \end{bmatrix}$ | $\begin{bmatrix} 0 & \cos\alpha & 0 \\ 1 & 0 & 0 \\ 0 & -\sin\alpha & 0 \end{bmatrix}$ | $\begin{bmatrix} \sin\beta & 0 & 0 \\ \cos\beta & 0 & 0 \\ 0 & 1 & 0 \end{bmatrix}$ | $\begin{bmatrix} -\sin\beta & 0 & 0 \\ \cos\beta & 0 & 0 \\ 0 & 1 & 0 \end{bmatrix}$ |
| Position | Parallel to YOZ plane | | Parallel to XOZ plane | | Lean to YOZ plane | | Lean to XOY plane | |
| R1 | | | | $\begin{bmatrix} 1 & 0 & 0 \\ 0 & 1 & 0 \\ 0 & 0 & 1 \end{bmatrix}$ | | | | |

The direction of the survey line is the positive direction of the coordinate axis, Y' is usually negative, α is an angle (acute angle) between the tangent of the survey line along the XOZ plane and the Z axis, and β is an angle (acute angle) between the horizontal direction and the longitudinal direction of the survey line.

After the resistivity data points under the three-dimensional coordinate system are acquired, the acquired resistivity data points under a three-dimensional rectangular coordinate system under a plurality of planes form a three-dimensional model of a smooth curved surface through the Kriging interpolation method.

Understandably, other value methods may also be used to form a three-dimensional model of a smooth surface.

Embodiment 2

Figure 2:
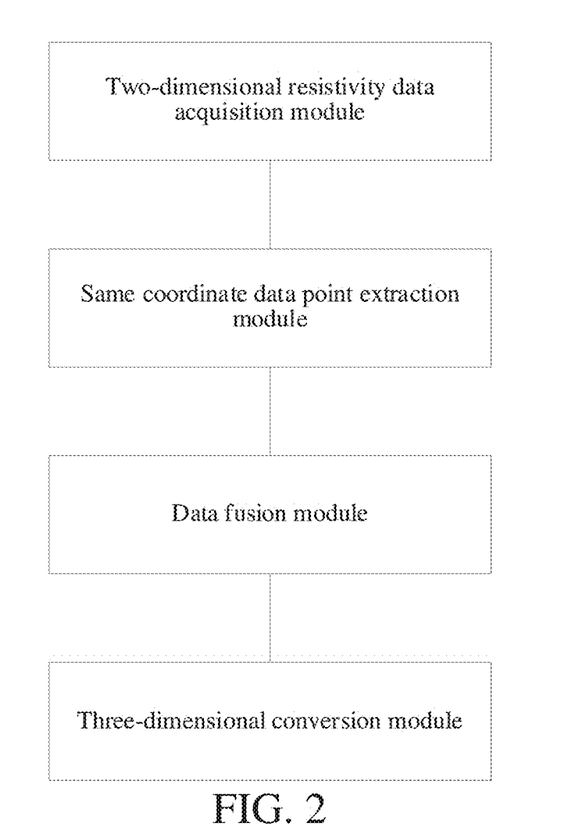
FIG. 2 is a structural schematic diagram of a three-dimensional electrical resistivity tomography system of an embodiment of the present invention.
Figure 3:
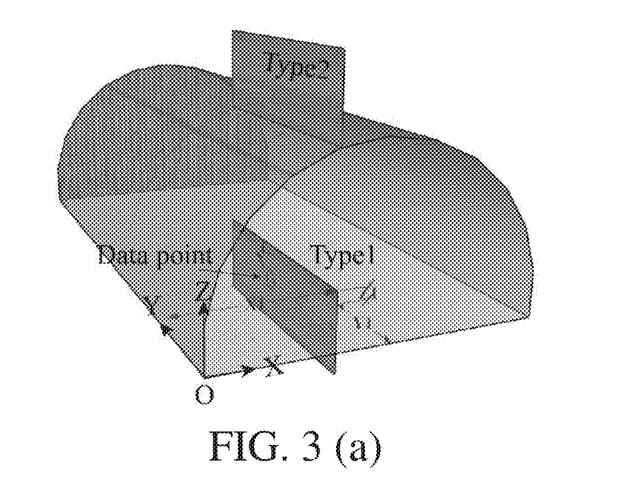
FIG. 3(a) is a coordinate conversion mode under a first survey line mode within a tunnel range of an embodiment of the present invention.
FIG. 3(b) is a coordinate conversion mode under a second survey line mode within a tunnel range of an embodiment of the present invention.
FIG. 3(c) is a coordinate conversion mode under a third survey line mode within a tunnel range of an embodiment of the present invention.
FIG. 3(d) is a coordinate conversion mode under a fourth survey line mode within a tunnel range of an embodiment of the present invention.

As shown in FIG. 2, a three-dimensional electrical resistivity tomography system of this embodiment includes:

(1) A two-dimensional resistivity data acquisition module, configured to prospect a region containing a geological anomaly with at least two prospecting modes respectively to acquire two-dimensional resistivity data of a corresponding detection plane.

Specifically, geological analysis is carried out to determine a geological anomaly region. Through engineering geological survey and drilling columnar information, distribution conditions of geological and hydrological phenomena such as geological structure, topography fluctuation, overburden rock, karst cave development, fault with water permeability, and the like in the region are analyzed. Geological data and the like of the region can also be consulted to determine the general position of the geological anomaly body, thus determining a geophysical prospecting way with reference to the factors such as mineral composition, aquosity, and the like of site rock.

(2) A same coordinate data point extraction module, configured to unify coordinate systems of resistivity data points acquired in all prospecting modes and extract data points with the same coordinates.

Specifically, in the same coordinate data point extraction module, coordinate conversion is carried out on resistivity data points acquired in other prospecting modes by taking a coordinate system of resistivity data points acquired in one prospecting mode as a reference.

(3) A data fusion module, configured to carry out data fusion on extracted resistivity data at the same position by utilizing a principal component analysis method.

The data fusion module comprises:

a data centralization module, configured to standardize resistivity data acquired in all prospecting modes;

a covariance matrix solving module, configured to solve a covariance matrix between standardized variables and measure whether deviation change trends of two variables are consistent or not;

a characteristic value and characteristic vector solving module, configured to solve characteristic values and characteristic vectors of covariance, arrange the characteristic values in an ascending order, select the largest characteristic value, and solve the characteristic vector corresponding to the largest characteristic value; and a data projection module, configured to project a sample point of the centralized data to a characteristic vector base with the maximum characteristic value to acquire a fused resistivity data result.

(4) A three-dimensional conversion module, configured to carry out three-dimensional coordinate conversion on resistivity data acquired after fusion to form a three-dimensional model.

Specifically, in the three-dimensional conversion module, converted three-dimensional coordinates form a three-dimensional model through a Kriging interpolation method.

This embodiment compares resistivity data acquired with at least two geophysical prospecting methods to select out resistivity data points with the same prospecting region coordinates, carry out data fusion on the data points acquired with the at least two geophysical prospecting methods based on a principal component analysis method, and finally form a three-dimensional model through three-dimensional coordinate conversion. The detection precision is improved, and meanwhile the detection result has good intuitiveness and visibility.

Embodiment 3

This embodiment provides a computer readable storage medium which stores a computer program. The steps in the three-dimensional electrical resistivity tomography method as described in Embodiment 1 are implemented when the program is executed by a processor.

This embodiment compares resistivity data acquired with at least two geophysical prospecting methods to select out resistivity data points with the same prospecting region coordinates, carry out data fusion on the data points acquired with the at least two geophysical prospecting methods based on a principal component analysis method, and finally form a three-dimensional model through three-dimensional coordinate conversion. The detection precision is improved, and meanwhile the detection result has good intuitiveness and visibility.

Embodiment 4

This embodiment provides computer device which comprises a memory, a processor and a computer program stored in the memory and capable of running on the processor. The steps in the three-dimensional electrical resistivity tomography method as described in Embodiment 1 are implemented when the program is executed by the processor.

This embodiment compares resistivity data acquired with at least two geophysical prospecting methods to select out resistivity data points with the same prospecting region coordinates, carry out data fusion on the data points acquired with the at least two geophysical prospecting methods based on a principal component analysis method, and finally form a three-dimensional model through three-dimensional coordinate conversion. The detection precision is improved, and meanwhile the detection result has good intuitiveness and visibility.

A person skilled in the art should understand that the embodiments of the present invention may be provided as a method, a system, or a computer program product. Therefore, the present invention may take the form of a hardware embodiment, a software embodiment, or a combination of software and hardware embodiments. Moreover, the present invention may use a form of a computer program product that is implemented on one or more computer-usable storage media (including but not limited to a disk memory, an optical memory, and the like) that include computer-usable program code.

The present invention is described with reference to the flowcharts and/or block diagrams of the method, the device (system), and the computer program product according to the embodiments of the present invention. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a dedicated computer, an embedded processor, or a processor of another programmable data processing apparatus to generate a machine, so that the instructions executed by the computer or the processor of the another programmable data processing apparatus generate an apparatus for implementing a specific function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

A person of ordinary skill in the art may understand that all or some of the procedures of the methods of the foregoing embodiments may be implemented by a computer program instructing relevant hardware. The program may be stored in a computer-readable storage medium. When the program is executed, the procedures of the foregoing method embodiments may be implemented. The foregoing storage medium may include a magnetic disc, an optical disc, a read-only memory (ROM), a random access memory (RAM), or the like.

The foregoing descriptions are merely preferred embodiments of the present invention, but are not intended to limit the present invention. A person skilled in the art may make various alterations and variations to the present invention. Any modification, equivalent replacement, or improvement made and the like within the spirit and principle of the present invention shall fall within the protection scope of the present invention.

What is claimed is:

1. A computer-implemented method for implementing a three-dimensional electrical resistivity tomography, comprising:
    prospecting a region containing a geological anomaly with at least two prospecting modes respectively to acquire cross-hole resistivity detection data and detection surface ERT data, carrying out on the cross-hole resistivity detection data and the detection surface ERT data by geophysical inversion, taking the cross-hole resistivity detection data and the detection surface ERT data as a forward basis and adjusting model parameters continuously to make a model response to respond to the cross-hole resistivity detection data and the detection surface ERT data, and acquiring two-dimensional resistivity data of a corresponding detection plane;
    unifying coordinate systems of resistivity data points acquired in all prospecting modes, and extracting data points with the same coordinates;
    carrying out a data fusion on extracted resistivity data at the same position by utilizing a principal component analysis method; and
    carrying out a three-dimensional coordinate conversion on the resistivity data acquired after fusion to form a three-dimensional model having obvious distinction of anomaly boundaries and without pseudo anomaly interference;
    wherein the at least two prospecting modes comprise a surface ERT prospecting mode and a cross-hole resistivity CT prospecting mode;
    wherein the cross-hole resistivity prospecting mode comprises drilling a specified position, arranging a transmitting electrode and a receiving electrode respectively in a transmitting hole and a receiving hole according to a certain electrode distance, electrifying the transmitting electrode and the receiving electrode, and acquiring the cross-hole resistivity detection data;
    wherein the surface ERT prospecting mode comprises arranging surface electrodes on a ground survey line, using a program-controlled electrode change-over switch and a microcomputer engineering electrical surveying instrument to acquire the detection surface ERT data.

2. The method according to claim 1, wherein a process of carrying out data fusion on the extracted resistivity data at the same position by utilizing a principal component analysis method is as follows:
    carrying out a data centralization, that is, standardizing resistivity data acquired in all prospecting modes;

solving a covariance matrix between standardized variables, and measuring whether deviation change trends of two variables are consistent or not;

solving characteristic values and characteristic vectors of covariance, arranging the characteristic values in an ascending order, selecting the largest characteristic value, and solving the characteristic vector corresponding to the largest characteristic value; and projecting a sample point of the centralized data to a characteristic vector base with the maximum characteristic value to acquire a fused resistivity data result.

3. The method according to claim 1, wherein the coordinate conversion is carried out on resistivity data points acquired in other prospecting modes by taking a coordinate system of resistivity data points acquired in one prospecting mode as a reference.

4. The method according to claim 1, wherein converted three-dimensional coordinates form a three-dimensional model through a Kriging interpolation method.

5. A system for implementing a three-dimensional electrical resistivity tomography, comprising:
a two-dimensional resistivity data acquisition module, configured to prospect a region containing a geological anomaly with at least two prospecting modes respectively to acquire cross-hole resistivity detection data and detection surface ERT data, carrying out on the cross-hole resistivity detection data and the detection surface ERT data by geophysical inversion, take the cross-hole resistivity detection data and the detection surface ERT data as a forward basis and adjust model parameters continuously to make a model response to respond to the cross-hole resistivity detection data and the detection surface ERT data, and acquire two-dimensional resistivity data of a corresponding detection plane;
a same coordinate data point extraction module, configured to unify coordinate systems of resistivity data points acquired in all prospecting modes and extract data points with the same coordinates;
a data fusion module, configured to carry out data fusion on extracted resistivity data at the same position by utilizing a principal component analysis method; and
a three-dimensional conversion module, configured to carry out three-dimensional coordinate conversion on resistivity data acquired after fusion to form a three-dimensional model having obvious distinction of anomaly boundaries and without pseudo anomaly interference;
wherein the at least two prospecting modes comprise a surface ERT prospecting mode and a cross-hole resistivity CT prospecting mode;
wherein the cross-hole resistivity prospecting mode comprises drilling a specified position, arranging a transmitting electrode and a receiving electrode respectively in a transmitting hole and a receiving hole according to a certain electrode distance, electrifying the transmitting electrode and the receiving electrode, and acquiring the cross-hole resistivity detection data;
wherein the surface ERT prospecting mode comprises arranging surface electrodes on a ground survey line, using a program-controlled electrode change-over switch and a microcomputer engineering electrical surveying instrument to acquire the detection surface ERT data.

6. The system according to claim 5, wherein the data fusion module comprises:
a data centralization module, configured to standardize resistivity data acquired in all prospecting modes;
a covariance matrix solving module, configured to solve a covariance matrix between standardized variables and measure whether deviation change trends of two variables are consistent or not;
a characteristic value and characteristic vector solving module, configured to solve characteristic values and characteristic vectors of covariance, arrange the characteristic values in an ascending order, select the largest characteristic value, and solve the characteristic vector corresponding to the largest characteristic value; and
a data projection module, configured to project a sample point of the centralized data to a characteristic vector base with the maximum characteristic value to acquire a fused resistivity data result.

7. The system according to claim 5, wherein in the same coordinate data point extraction module, coordinate conversion is carried out on resistivity data points acquired in other prospecting modes by taking a coordinate system of resistivity data points acquired in one prospecting mode as a reference.

8. The system according to claim 5, wherein in the three-dimensional conversion module, converted three-dimensional coordinates form a three-dimensional model through a Kriging interpolation method.

9. A device for implementing a three-dimensional electrical resistivity tomography, comprising:
a non-transitory computer-readable medium, storing a computer program; and
a processor executing the computer program stored in the medium,
wherein when executed by the processor, the computer program causes the device to:
prospect a region containing a geological anomaly with at least two prospecting modes respectively to acquire cross-hole resistivity detection data and detection surface ERT data, carrying out on the cross-hole resistivity detection data and the detection surface ERT data by geophysical inversion, take the cross-hole resistivity detection data and the detection surface ERT data as a forward basis and adjust model parameters continuously to make a model response to respond to the cross-hole resistivity detection data and the detection surface ERT data, and acquire two-dimensional resistivity data of a corresponding detection plane;
unify coordinate systems of resistivity data points acquired in all prospecting modes, and extracting data points with the same coordinates;
carry out a data fusion on extracted resistivity data at the same position by utilizing a principal component analysis method; and
carry out a three-dimensional coordinate conversion on resistivity data acquired after fusion to form a three-dimensional model having obvious distinction of anomaly boundaries and without pseudo anomaly interference;
wherein the at least two prospecting modes comprise a surface ERT prospecting mode and a cross-hole resistivity CT prospecting mode;
wherein the cross-hole resistivity prospecting mode comprises drilling a specified position, arranging a transmitting electrode and a receiving electrode respectively in a transmitting hole and a receiving hole according to a certain electrode distance, electrifying the transmitting electrode and the receiving electrode, and acquiring the cross-hole resistivity detection data;

wherein the surface ERT prospecting mode comprises arranging surface electrodes on a ground survey line, using a program-controlled electrode change-over switch and a microcomputer engineering electrical surveying instrument to acquire the detection surface ERT data.

10. The device according to claim 9,
wherein a process of carrying out data fusion on the extracted resistivity data at the same position by utilizing a principal component analysis method is as follows:

carrying out data centralization, that is, standardizing resistivity data acquired in all prospecting modes;

solving a covariance matrix between standardized variables, and measuring whether deviation change trends of two variables are consistent or not;

solving characteristic values and characteristic vectors of covariance, arranging the characteristic values in an ascending order, selecting the largest characteristic value, and solving the characteristic vector corresponding to the largest characteristic value; and projecting a sample point of the centralized data to a characteristic vector base with the maximum characteristic value to acquire a fused resistivity data result.

11. The device according to claim 9, wherein coordinate conversion is carried out on resistivity data points acquired in other prospecting modes by taking a coordinate system of resistivity data points acquired in one prospecting mode as a reference.

12. The device according to claim 9, wherein converted three-dimensional coordinates form a three-dimensional model through a Kriging interpolation method.

\* \* \* \* \*